United States Patent
Mu et al.

(10) Patent No.: US 11,139,854 B2
(45) Date of Patent: Oct. 5, 2021

(54) METHOD FOR SPREAD SPECTRUM COMMUNICATION, USER EQUIPMENT AND BASE STATION

(71) Applicant: NTT DOCOMO, INC., Tokyo (JP)

(72) Inventors: Qin Mu, Beijing (CN); Liu Liu, Beijing (CN); Wenjia Liu, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/958,905

(22) PCT Filed: Oct. 26, 2018

(86) PCT No.: PCT/CN2018/112136
§ 371 (c)(1),
(2) Date: Jun. 29, 2020

(87) PCT Pub. No.: WO2019/128432
PCT Pub. Date: Jul. 4, 2019

(65) Prior Publication Data
US 2020/0343937 A1    Oct. 29, 2020

(30) Foreign Application Priority Data
Dec. 29, 2017   (CN) .......................... 201711487607.7

(51) Int. Cl.
*H04B 1/7097*   (2011.01)
*H04B 1/713*    (2011.01)

(52) U.S. Cl.
CPC ........... *H04B 1/7097* (2013.01); *H04B 1/713* (2013.01)

(58) Field of Classification Search
CPC ........ H04B 1/7097; H04B 1/713; H04B 1/00; H04B 1/69; H04B 1/692; H04B 1/707;
(Continued)

(56) References Cited

U.S. PATENT DOCUMENTS 7,327,775 B1 *  2/2008  Gu .................... H04B 1/707
                                                    375/130
7,366,222 B2 *  4/2008  Song .................. H04B 1/707
                                                    375/130
(Continued)

FOREIGN PATENT DOCUMENTS

CN           106576013 A        4/2017

OTHER PUBLICATIONS

International Search Report issued in Application No. PCT/CN2018/112136, dated Mar. 13, 2019 (5 pages).
(Continued)

*Primary Examiner* — James M Perez
(74) *Attorney, Agent, or Firm* — Osha Bergman Watanabe & Burton LLP

(57) ABSTRACT

A method for spread spectrum communication, a user equipment and a base station are provided in embodiments of the present disclosure. The method for spread spectrum communication applied to a user equipment includes: selecting spreading sequences for a plurality of symbols of data to be transmitted in a set of spreading sequences, respectively, wherein spreading sequences selected for at least two symbols are different; spreading the data by using the selected spreading sequences; transmitting the spread data.

12 Claims, 5 Drawing Sheets

(58) Field of Classification Search
CPC .. H04B 1/0678; H04B 1/7136; H04B 1/7143; H04B 1/7152; H04B 1/7154; H04J 13/00; H04J 13/0007; H04J 13/004; H04J 13/0044; H04J 13/0077; H04J 13/16; H04J 2013/0081–0092

See application file for complete search history.

(56) References Cited

U.S. PATENT DOCUMENTS

| | | | | |
|---|---|---|---|---|
| 7,400,603 | B1* | 7/2008 | Wakizaka | H04W 16/06 370/332 |
| 7,420,916 | B2* | 9/2008 | Zhang | H04L 25/0204 370/210 |
| 8,090,003 | B2* | 1/2012 | Bang | H04J 13/0044 375/140 |
| 8,218,599 | B2* | 7/2012 | Miller | H04B 1/707 375/130 |
| 8,290,024 | B2* | 10/2012 | Sampath | H04B 1/707 375/148 |
| 8,385,388 | B2* | 2/2013 | Soriaga | H04B 1/71072 375/148 |
| 8,565,287 | B2* | 10/2013 | Hahm | H04B 1/712 375/148 |
| 8,605,802 | B2* | 12/2013 | Lee | H04L 27/2602 375/260 |
| 8,971,442 | B2* | 3/2015 | Olesen | H04L 1/0643 375/295 |
| 10,367,677 | B2* | 7/2019 | Parkvall | H04B 7/0695 |
| 10,396,940 | B1* | 8/2019 | Nammi | H04L 1/1812 |
| 10,516,517 | B2* | 12/2019 | Xiong | H04L 5/0053 |
| 10,594,429 | B2* | 3/2020 | Ma | H04J 13/0003 |
| 10,673,575 | B2* | 6/2020 | Nammi | H04B 1/713 |
| 10,798,686 | B2* | 10/2020 | Gao | H04L 1/1671 |
| 10,805,911 | B2* | 10/2020 | Matsumura | H04L 27/2613 |
| 2004/0085924 | A1* | 5/2004 | Zhang | H04W 52/16 370/328 |
| 2004/0218697 | A1* | 11/2004 | Liu | H04L 1/0618 375/340 |
| 2008/0009288 | A1* | 1/2008 | Orfanos | H04B 1/69 455/436 |
| 2008/0031369 | A1* | 2/2008 | Li | H04L 1/0618 375/260 |
| 2008/0095121 | A1* | 4/2008 | Shattil | H04L 27/2602 370/335 |
| 2010/0054223 | A1* | 3/2010 | Zhang | H04W 16/28 370/338 |
| 2010/0098182 | A1* | 4/2010 | Forck | H04L 27/2636 375/261 |
| 2010/0165952 | A1* | 7/2010 | Sung | H04B 1/713 370/335 |
| 2011/0019757 | A1* | 1/2011 | Yamada | H04L 25/0228 375/260 |
| 2011/0267972 | A1* | 11/2011 | Yoon | H04L 27/2607 370/252 |
| 2012/0263124 | A1* | 10/2012 | Gaal | H04W 72/048 370/329 |
| 2013/0100933 | A1* | 4/2013 | Kim | H04W 52/367 370/335 |
| 2013/0279632 | A1* | 10/2013 | Kim | H04L 27/20 375/302 |
| 2015/0110160 | A1* | 4/2015 | Gurcan | H04J 13/0077 375/141 |
| 2017/0238261 | A1 | 8/2017 | Benjebbour et al. | |
| 2017/0289924 | A1* | 10/2017 | Fu | H04W 52/246 |
| 2017/0331577 | A1* | 11/2017 | Parkvall | H04J 11/0079 |
| 2017/0331670 | A1* | 11/2017 | Parkvall | H04W 52/0245 |
| 2018/0279294 | A1* | 9/2018 | Gao | H04W 72/14 |
| 2018/0351681 | A1* | 12/2018 | Ma | H04J 13/0003 |
| 2019/0158206 | A1* | 5/2019 | Li | H04J 13/0048 |
| 2019/0165913 | A1* | 5/2019 | He | H04L 27/26035 |
| 2019/0207723 | A1* | 7/2019 | Lei | H04L 5/0094 |
| 2019/0222457 | A1* | 7/2019 | Wei | H04L 27/18 |
| 2019/0245640 | A1* | 8/2019 | Yoshimoto | H04L 5/0053 |
| 2019/0313398 | A1* | 10/2019 | Matsumura | H04L 27/26 |
| 2019/0349110 | A1* | 11/2019 | Nammi | H04L 25/03305 |
| 2019/0377894 | A1* | 12/2019 | Jang | G06F 21/6218 |
| 2020/0052841 | A1* | 2/2020 | Takeda | H04J 13/004 |
| 2020/0077402 | A1* | 3/2020 | Lei | H04L 1/0003 |
| 2020/0100240 | A1* | 3/2020 | Takeda | H04L 5/001 |
| 2020/0186189 | A1* | 6/2020 | Herath | H04L 1/0003 |
| 2020/0244390 | A1* | 7/2020 | Takeda | H04L 5/0055 |
| 2020/0259597 | A1* | 8/2020 | Nammi | H04L 1/1858 |
| 2020/0343937 | A1* | 10/2020 | Mu | H04B 1/7103 |
| 2020/0389260 | A1* | 12/2020 | Matsumura | H04W 72/0413 |
| 2020/0403835 | A1* | 12/2020 | Matsumura | H04L 27/26 |
| 2020/0404652 | A1* | 12/2020 | Matsumura | H04W 72/042 |
| 2020/0404653 | A1* | 12/2020 | Matsumura | H04W 72/12 |
| 2021/0037519 | A1* | 2/2021 | Matsumura | H04W 72/0413 |
| 2021/0037526 | A1* | 2/2021 | Takeda | H04W 72/02 |
| 2021/0083913 | A1* | 3/2021 | Matsumura | H04L 27/2646 |
| 2021/0136749 | A1* | 5/2021 | Matsumura | H04W 72/12 |
| 2021/0160909 | A1* | 5/2021 | Matsumura | H04W 72/04 |
| 2021/0160910 | A1* | 5/2021 | Matsumura | H04W 72/0413 |

OTHER PUBLICATIONS

Written Opinion issued in International Application No. PCT/CN2018/112136, dated Mar. 13, 2019 (6 pages).

* cited by examiner

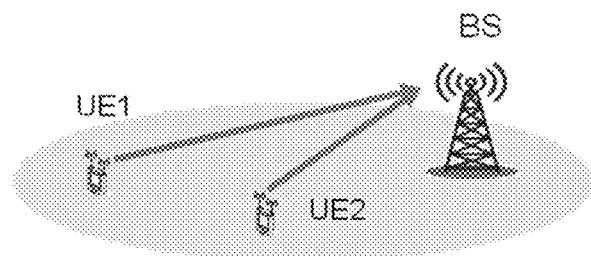
FIG. 1
$$S = \begin{bmatrix} s1 & s2 & s3 & s4 & s5 & s6 \\ -1+i & -i & -1+i & -1-i & -1 & -1-i \\ -1 & 0 & 1-i & -1-i & 1+i & i \\ -1 & 0 & -i & -1 & 0 & -1+i \\ -1-i & -1+i & 1+i & -1 & 1-i & 1-i \end{bmatrix}$$
FIG. 2
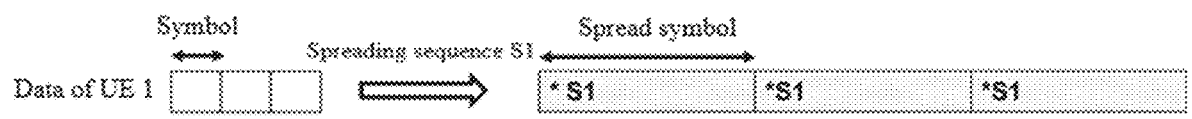
FIG. 3

METHOD FOR SPREAD SPECTRUM COMMUNICATION, USER EQUIPMENT AND BASE STATION

TECHNICAL FIELD

The present disclosure relates to a field of wireless communication, and in particular to a method for spread spectrum communication, a user equipment and a base station that may be used in a wireless communication system.

BACKGROUND

Spread spectrum communication technology is a technology that utilizes information processing to improve transmission performance, and characterized in that the bandwidth used to transmit data is much greater than the bandwidth occupied by the data itself. The spread spectrum communication technology spreads data with a spreading sequence at a sending end, and de-spreads according to the same spreading sequence at a receiving end to recover the transmitted data. The spread spectrum communication technology may obtain strong anti-interference ability and high transmission rate by using a wide spectrum, and since data of different user equipment may be carried in a same frequency band by using different spreading sequences, the spread spectrum communication technology also improves a multiplexing rate of the frequency band.

Non-Orthogonal Multiple Access (NOMA) technology of 5G may use non-orthogonal transmission at the sending end, which actively introduces interference information and achieves correct demodulation through Successive Interference Cancellation (SIC) at the receiving end. Sub-channels of NOMA are orthogonal, but a same sub-channel is shared by a plurality of user equipment, and non-orthogonal transmission is realized between different user equipment on the same sub-channel. In general, a base station allocates different spreading sequences for different user equipment on a same sub-channel, so that spread data between different user equipment is orthogonal as much as possible. However, in order to reduce signaling overhead, a resource allocation method based on RACH-less scheduling will be introduced. In this case, instead of allocating spreading sequences by the base station, the user equipment usually needs to select spreading sequences by itself in a set of pre-configured spreading sequences for spreading. At this time, if two or more user equipment on a same sub-channel select a same spreading sequence, there will be continuous collision and interference between data transmitted by them, which is unfavorable to correct de-spreading of the data by the base station.

Therefore, there is a need for a method for spread spectrum communication that minimizes interference between spread data transmitted by a plurality of user equipment.

SUMMARY OF THE DISCLOSURE

According to an aspect of the present disclosure, a method for spread spectrum communication applied to a user equipment is provided, comprising: selecting spreading sequences for a plurality of symbols of data to be transmitted in a set of spreading sequences, respectively, wherein spreading sequences selected for at least two symbols are different; spreading the data by using the selected spreading sequences; transmitting the spread data.

According to another aspect of the present disclosure, a method for spread spectrum communication applied to a base station is provided, comprising: receiving spread data transmitted by a user equipment, wherein at least two spread symbols of the data are obtained by spreading with different spreading sequences, and the spreading sequences are selected from a set of spreading sequences; de-spreading the data according to the spreading sequences in the set of spreading sequences.

According to another aspect of the present disclosure, a user equipment is provided, comprising: a selecting unit configured to select spreading sequences for a plurality of symbols of data to be transmitted in a set of spreading sequences, respectively, wherein spreading sequences selected for at least two symbols are different; a spreading unit configured to spread the data by using the selected spreading sequences; a transmitting unit configured to transmit the spread data.

According to another aspect of the present disclosure, a base station is provided, comprising: a receiving unit configured to receive spread data transmitted by a user equipment, wherein at least two spread symbols of the data are obtained by spreading with different spreading sequences, and the spreading sequences are selected from a set of spreading sequences; a de-spreading unit configured to de-spread the data according to the spreading sequences in the set of spreading sequences.

With the method for spread spectrum communication, the user equipment and the base station according to the above aspects of the present disclosure, the user equipment can respectively select spreading sequences in the set of spreading sequences for a plurality of symbols of the data to be transmitted, and ensure that spreading sequences for at least two symbols are different, so as to minimize continuous collision and interference between spread data transmitted by different user equipment, which facilitates correct reception and de-spreading of the received spread data by the base station, reduces a block error rate of data transmission and improves accuracy of data decoding.

BRIEF DESCRIPTION OF THE DRAWINGS

The above and other objects, features and advantages of the present disclosure will become clearer by describing embodiments of the present disclosure in details with reference to the accompanying drawings.

FIG. 1 is a schematic diagram of a communication system for implementing a scenario of the embodiments of the present disclosure;

FIG. 2 shows an example of a set of spreading sequences;

FIG. 3 shows a schematic diagram of a user equipment spreading the transmitted data;

DESCRIPTION OF THE EMBODIMENTS

Figure 4:
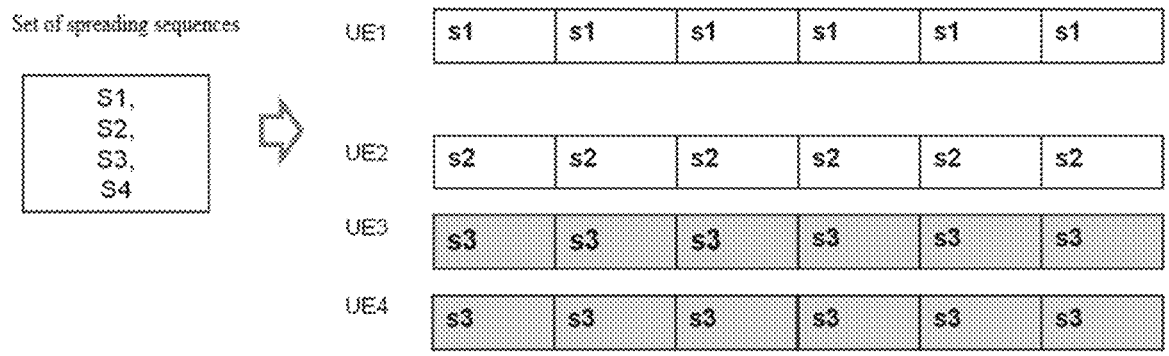
FIG. 4 shows an example in which a plurality of UEs respectively select spreading sequences in the set of spreading sequences for spreading and transmitting data.

A method for spread spectrum communication and a corresponding user equipment and base station according to the embodiments of the present disclosure will be described below with reference to the accompanying drawings. Like reference numerals represent like elements throughout the accompanying drawings. It should be understood that the embodiments described herein are merely illustrative and should not be construed as limiting the scope of the present disclosure.

FIG. 1 shows a schematic diagram of a communication system for implementing a scenario of the embodiments of the present disclosure. As shown in FIG. 1, the base station BS may generate wireless connections with two user equipment UE 1 and UE 2 respectively, and UE 1 and UE 2 may transmit data to the base station respectively. Optionally, UE 1 and UE 2 may also transmit spread data to the base station respectively. In one example, the base station may directly configure spreading sequences for UE 1 and UE 2, respectively, and transmit them to the base station through signaling. In another example, in order to save signaling transmission between the base station and the user equipment as much as possible, a set of spreading sequences may be configured, so that when spread spectrum communication is performed, UE 1 and UE 2 select spreading sequences from the set of spreading sequences respectively for spreading. The set of spreading sequences may include a plurality of spreading sequences, and each spreading sequence may include one or more elements. For example, the set of spreading sequences may be pre-configured, in the base station and the UE, or may be configured by the base station and notified to the UE through various signaling. The set may be configured by the base station according to actual conditions, or may be a set described in the 3GPP standard. The structure of the communication system shown in FIG. 1 is only an example, and in an actual application scenario, the base station may generate connections with any number of user equipment and perform signaling and data transmission.

FIG. 2 shows an example of the set of spreading sequences. As shown in FIG. 2, the set of spreading sequences, S, may include 6 spreading sequences, namely S1, S2, S3, S4, S5 and S6, and each spreading sequence may include 4 elements respectively. FIG. 3 shows a schematic diagram of the user equipment spreading the transmitted data. As shown in FIG. 3, the user equipment UE 1 may select a spreading sequence S1 for spreading, in which, for three symbols of UE 1 data, UE 1 applies the same spreading sequence S1 to these three symbols for spreading, and thus spread data including three spread symbols are formed, each spread symbol including 4 symbols. UE 1 may transmit the spread data to the base station, so that the base station may receive and de-spread the data. Specifically, the base station may select the spreading sequence S1 that is the same as the spreading sequence selected by UE 1 in the set of spreading sequences S, to de-spread the spread data transmitted by UE 1. In practice, the base station may use the same spreading sequence S1 for each spread symbol of the spread data for de-spreading.

However, when different user equipment selects a same spreading sequence in the set of spreading sequences for spreading, and all symbols of the UE are spread using the same spreading sequence, continuous interference will be directly generated between spread data of these user equipment, and a probability of de-spreading failure by the base station will increase greatly. FIG. 4 shows an example in which a plurality of UEs respectively select spreading sequences in the set of spreading sequences for spreading and transmitting data. It can be seen from FIG. 4 that when UE 1-UE 4 all select in the set of spreading sequences having spreading sequences S1, S2, S3, and S4, it is assumed that UE 1 selects the spreading sequence S5, UE 2 selects the spreading sequence S2, while UE 3 and UE 4 select the same spreading sequence S3 for spreading. In this case, spread data of UE 1 and UE 2 will not interfere much with spread data of other UEs. However, continuous and irreversible interference will be generated between spread data of UE 3 and UE 4 due to the same spreading sequence, which may lead to a de-spreading failure after the base station receives the data and thus cannot obtain correct data transmitted by UE 3 and UE 4.

A method for spread spectrum communication is provided by the embodiments of the present disclosure, which may minimize interference between spread data transmitted by a plurality of user equipment as much as possible.

Figure 5:
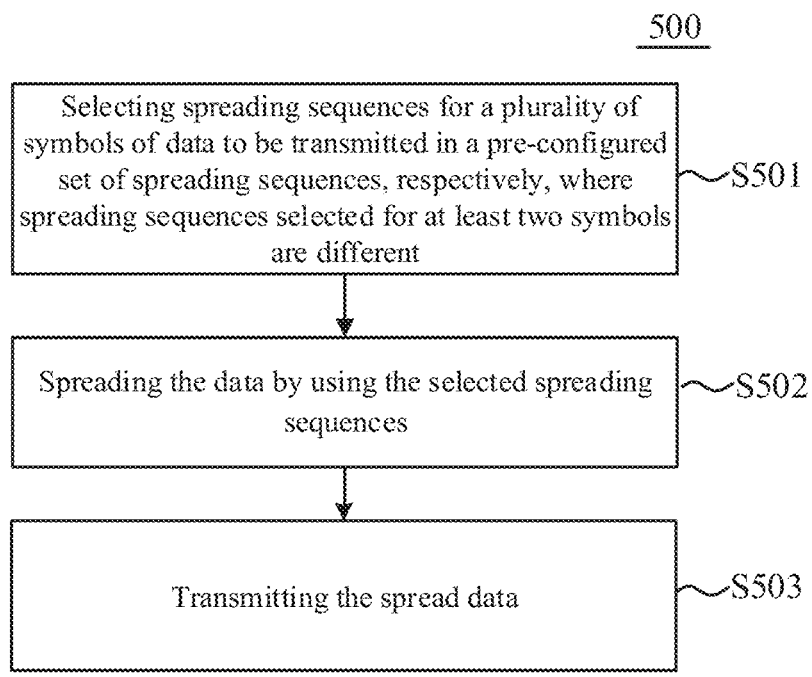
FIG. 5 shows a flowchart of a method for spread spectrum communication according to the embodiments of the present disclosure.

First, a method for spread spectrum communication performed by a user equipment according to the embodiments of the present disclosure will be described below with reference to FIG. 5. FIG. 5 shows a flowchart of the method 500 for spread spectrum communication.

As shown in FIG. 5, in step S501, in a set of spreading sequences, spreading sequences are selected for a plurality of symbols of data to be transmitted, where spreading sequences selected for at least two symbols are different.

In this step, the UE may select respective spreading sequences for different symbols of the data to be transmitted, so as to avoid continuous mutual interference with spread data of other UEs as much as possible. Specifically, at least two different spreading sequences may be selected so that spreading sequences for at least two symbols are different. As described above, the set of spreading sequences may be pre-configured, for example, in the base station and the UE, or may be configured by the base station according to actual conditions and notified to the UE through various signaling, for example, the base station may transmit the set of spreading sequences to the UE through high layer signaling.

Specifically, in a first implementation, the UE may randomly select spreading sequences for the plurality of symbols of the data to be transmitted in the set of spreading sequences, respectively. In this case, the UE randomly selects spreading sequences for at least two symbols of the data to be transmitted, respectively, and ensures that the spreading sequences for the at least two symbols are different.

Figure 6:
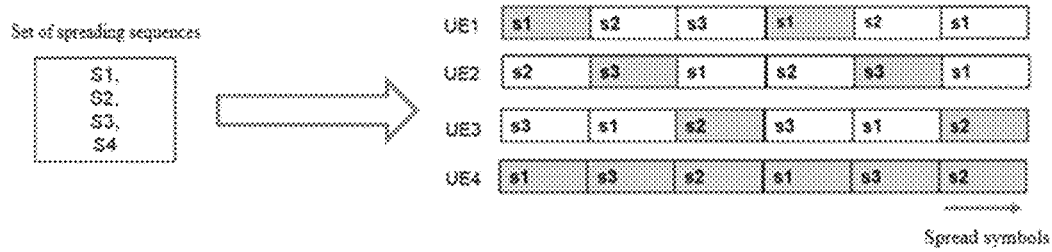
FIG. 6 shows a schematic diagram of a UE performing spreading in a first implementation of the embodiments of the present disclosure.

FIG. 6 shows a schematic diagram of the UE performing spreading in the first implementation of the embodiments of the present disclosure. As shown in FIG. 6, in the set of spreading sequences including the spreading sequences S1, S2, S3, and S4, UE 1-UE 4 may respectively select different spreading sequences for different symbols of their data for spreading. For example, as a result of a random selection, UE 1 may select the spreading sequence S1 for its first symbol for spreading, and the spreading sequence S2 for its second symbol for spreading, and so on. In addition, UE 2 may select the spreading sequence S2 for a first symbol for spreading, and the spreading sequence S3 for a second symbol for spreading. Therefore, spreading sequences used for respective symbols of respective UEs are randomly selected. In this way, continuous interference such as that between the spread data of UE 3 and UE 4 as shown in FIG. 4 mentioned above may be avoided as much as possible, and interference of different spread symbols in the data of UE 4, for example, may be dispersed between different users equipment. It can be seen from FIG. 6 that even though a first symbol of UE 4 and a first symbol of UE 1 select a same spreading sequence, and thus interference is generated between their spread symbols, there is no longer interference between second spread symbols of UE 1 and UE 4 because the spreading sequence S3 is randomly selected for the second symbol of UE land the spreading sequence S3 is randomly selected for the second symbol of UE 4. On the contrary, the second spread symbol of UE 4 changes to interfere with UE 2, so that interference between data transmitted by different user equipment may be randomized to facilitate reception and de-spreading of the data by the base station.

In a second implementation, the UE may firstly select a first spreading sequence for a first symbol in the set of spreading sequences, where the first symbol may be the first symbol in the data to be transmitted by the UE, and may also be a symbol designated arbitrarily by the UE; then determine a second spreading sequence for its second symbol in the set of spreading sequences based on the first spreading sequence for the first symbol and a hop number for the user equipment selected in a set of hop numbers, where the hop number represents an offset between spreading sequences in the set of spreading sequences. For example, the hop number may represent an offset between indexes of spreading sequences in the set of spreading sequences. Specifically, the first spreading sequence for the first symbol may be randomly selected by the UE in the set of spreading sequences, and the hop number may also be randomly selected by the UE in the set of hop numbers. The set of hop numbers may also be pre-configured, for example, the set of hop numbers may be pre-configured by the base station, or may be configured by the base station and notified to the UE through, for example, signaling and the like (for example, the base station may transmit the set of hop numbers to the UE through high layer signaling), and certainly may also be written into standards in advance. Optionally, the set of spreading sequences and the set of hop numbers may also jointly form a set of spreading sequence resources, which is pre-configured by the base station at the same time. When the UE determines the first spreading sequence for the first symbol and the hop number, the second spreading sequence in the set of spreading sequences may be determined accordingly. Specifically, the second spreading sequence may be determined according to an offset of the first spreading sequence in the set of spreading sequences indicated by the hop number, that is, the position of the first spreading sequence in the set of spreading sequences is shifted by the offset indicated by the hop number, and a spreading sequence at the position after the shift in the set of spreading sequences is determined as the second spreading sequence. Furthermore, optionally, the first symbol and the second symbol may be two adjacent symbols in a same transport block, or two symbols with a certain interval, which is not limited herein.

Furthermore, after determining the first spreading sequence for the first symbol and the second spreading sequence for the second symbol, the UE may continue to determine, in a similar manner with the second symbol, a third spreading sequence to a N-th spreading sequence for a third symbol to a N-th symbol for spreading. For example, the UE may continue to determine the third spreading sequence for the third symbol by using the second spreading sequence and the hop number previously selected, and so on, until the N-th spreading sequence for the N-th symbol is determined. Optionally, when the first spreading sequence is the i-th spreading sequence in the set of spreading sequences, the hop number is selected as f, and the total number of spreading sequences in the set of spreading sequences is M, the N-th spreading sequence for the N-th symbol may be expressed as, for example, the ((i+(N−1)×f) mod M+1)-th spreading sequence. The above description is only an example, and the hop number adopted by the UE for different symbols may also be different, for example, the hop number used to select the second spreading sequence for the second symbol may be 1, and the hop number used to select the third spreading sequence for the third symbol may be 3, which is not limited herein.

Figure 7:
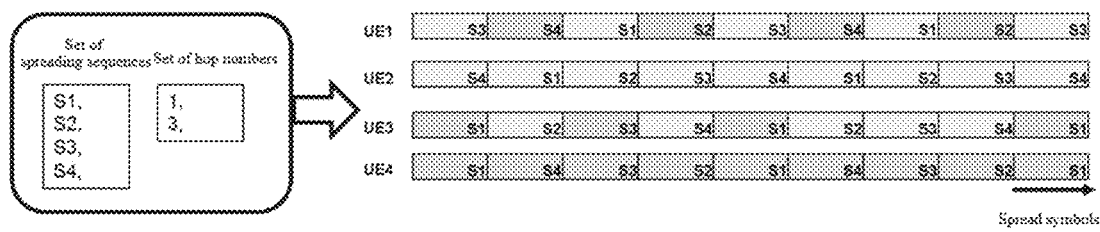
FIG. 7 shows a schematic diagram of a UE performing spreading in a second implementation of the embodiments of the present disclosure.

FIG. 7 shows a schematic diagram of the UE performing spreading in the second implementation of the embodiments of the present disclosure. As shown in FIG. 7, in the set of spreading sequences including spreading sequences S1, S2, S3, and S4 and the set of hop numbers including hop numbers 1 and 3, UE 1-UE 4 all can select their respective hop numbers, and select their respective spreading sequences for their first symbols for spreading. For example, the hop number selected by UE 1 is 1, and the first spreading sequence selected for the first symbol is S; the hop number selected by UE 2 is 1, and the first spreading sequence selected for the first symbol is S2; the hop number selected by UE 3 is 1, and the first spreading sequence selected for the first symbol is S3; the hop number selected by UE 4 is 3, and the first spreading sequence selected for the first symbol is S1. In this case, spread data of UE 1-UE 4 is shown in FIG. 6. It can be seen that although UE 1 and UE 4 both select the same first spreading sequence S1 for their first symbols, the second symbols have no interference due to the different hop numbers selected by UE 1 and UE 4, and thus continuous interference between spread data of UE 1 and UE 4 may be avoided as much as possible, so that interference between data transmitted by different user equipment may be randomized to facilitate reception and de-spreading of the data by the base station.

In a third implementation, the set of spreading sequences may include a plurality of groups of spreading sequences, and each group of spreading sequences may include one or more spreading sequences. Optionally, the number of spreading sequences included in these groups of spreading sequences may be the same or different. Under this premise, the UE may select groups of spreading sequences in the set of spreading sequences, and spread the plurality of symbols of the data by using spreading sequences in the selected groups of spreading sequences.

Specifically, the UE may firstly use each spreading sequence in the group of spreading sequences, respectively, to spread symbols with the same number as the number of spreading sequences included in a group of spreading sequences in the set of spreading sequences, and then perform spreading for each symbol of the data to be transmitted similarly. For example, when each group of spreading sequences in the set of spreading sequences includes 4 spreading sequences, the UE may use each spreading sequence in the selected groups of spreading sequences, respectively, to spread the data to be transmitted in units of 4 symbols, until all symbols are spread. Certainly, after the UE uses a certain selected group of spreading sequences to spread some symbols of the data, it may continue to use the same group of spreading sequences to spread other symbols, or it may reselect a different group of spreading sequences to spread other symbols. The specific manner for selecting groups of spreading sequences and the spreading manner are not limited herein.

Figure 8:
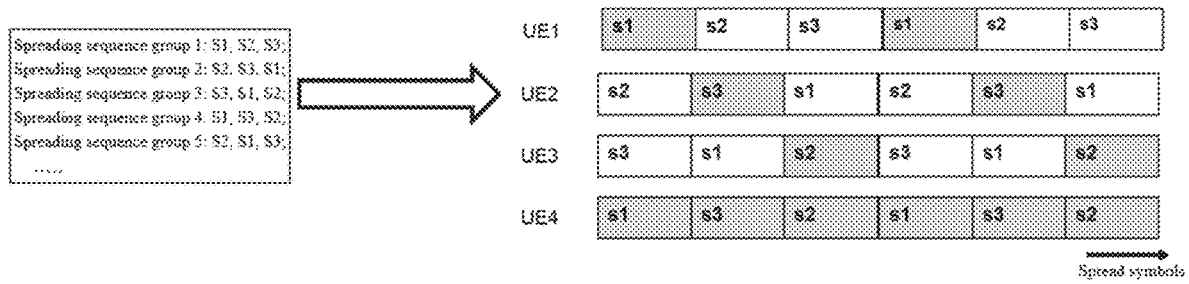
FIG. 8 shows a schematic diagram of a UE performing spreading in a third implementation of the embodiments of the present disclosure.

FIG. 8 shows a schematic diagram of the UE performing spreading in the third implementation of the embodiments of the present disclosure. As shown in FIG. 8, the set of spreading sequences includes at least 5 groups of spreading sequence, and each group of spreading sequences includes 3 spreading sequences. UE 1-UE 4 will select among these groups of spreading sequences to spread data. Specifically, UE 1 selects a spreading sequence group 1, and uses spreading sequences S1, S2, and S3 thereof to spread the first symbol to the third symbol of its data, and then, UE 1 continues to use the spreading sequence group 1 to spread the other symbols of its data in groups of three symbols, and obtains the final spread data. In a similar manner, UE 2-UE 4 select a spreading sequence group 2, a spreading sequence group 3 and a spreading sequence group 4 respectively for spreading. It can be seen that this spreading manner may avoid continuous interference between spread data of different UEs as much as possible, so that interference is randomized to facilitate reception and de-spreading of the data at the base station side.

Optionally, on the basis of the third implementation, the UE may also select a first group of spreading sequences for its first group of symbols in the set of spreading sequences, where the first group of symbols may be the first group of symbols in the data to be transmitted by the UE, or may be a group of symbols arbitrarily designated by the UE, and optionally, the number of symbols included in the first group of symbols may be the same as the number of spreading sequences included in one or more groups of spreading sequences in the set of spreading sequences; determine a second group of spreading sequences for its second group of symbols in the set of spreading sequences based on the first group of spreading sequences for the first group of symbols and a hop number for the user equipment selected in a set of hop numbers, where the hop number represents an offset between groups of spreading sequences in the set of spreading sequences. Specifically, the first group of spreading sequences for the first group of symbols may be randomly selected by the UE in a pre-configured set of spreading sequences, and the hop number may also be randomly selected by the UE in the set of hop numbers. The set of hop numbers may also be pre-configured, for example, the set of hop numbers may be pre-configured by the base station, or may be configured by the base station and notified to the UE through, for example, signaling and the like, and certainly may also be written into standards in advance. Optionally, the set of spreading sequences and the set of hop numbers may also jointly form a set of spreading sequence resources, which is pre-configured by the base station at the same time. When the UE determines the first groups of spreading sequences for the first group of symbols and the hop number, the second group of spreading sequences in the set of spreading sequences may be determined accordingly. Specifically, the second group of spreading sequences may be determined according to an offset of the first group of spreading sequences in the set of spreading sequences indicated by the hop number, that is, the position of the first group of spreading sequences in the set of spreading sequences is shifted by the offset indicated by the hop number, and a group of spreading sequences at the position after the shift in the set of spreading sequences is determined as the second group of spreading sequences. Furthermore, optionally, the first group of symbols and the second group of symbols may be two adjacent groups of symbols in a same transport block, or two groups of symbols with a certain interval, which is not limited herein.

Furthermore, after determining the first group of spreading sequences for the first group of symbols and the second group of spreading sequences for the second group of symbols, the UE may continue to determine, in a similar manner with the second group of symbols, a third group of spreading sequences to a N-th group of spreading sequences for a third group of symbols to a N-th group of symbols for spreading. For example, the UE may continue to determine the third group of spreading sequences for the third group of symbols by using the second group of spreading sequences and the hop number previously selected, and so on, until the N-th group of spreading sequences for the N-th group of symbols is determined. In addition, the hop number adopted by the UE for different groups of symbols may also be different, for example, the hop number used to select the second group of spreading sequences for the second group of symbols may be 1, and the hop number used to select the third group of spreading sequences for the third group of symbols may be 2, which is not limited herein.

Figure 9:
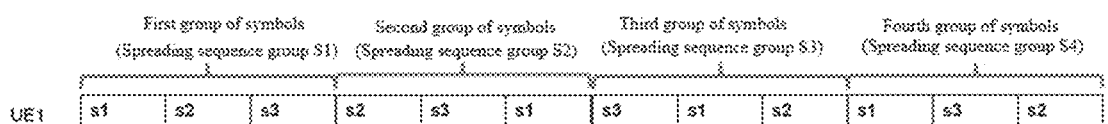
FIG. 9 shows a schematic diagram of another example of a UE performing spreading in the third implementation of the embodiments of the present disclosure.

FIG. 9 shows a schematic diagram of another example of the UE performing spreading in the third implementation of the embodiments of the present disclosure. On the basis of the embodiment shown in FIG. 8 and referring to FIG. 9, UE 1 may select the first group of spreading sequences as the spreading sequence group S1 and the hop number as 1. On this basis, UE 1 may perform spreading, for the first group of symbols including three symbols, by using each spreading sequence in the spreading sequence group S1, and then perform spreading, for the second group of symbols adjacent to the first group of symbols, by using the spreading sequence group S2 according to the selected hop number, and so on. The spreading manner for the data to be transmitted by the UE in FIG. 9 is only an example, and spreading sequences may be selected by using randomly selected groups of spreading sequences and hop number to spread the data, which is not limited herein.

In step S502, the data is spread by using the selected spreading sequences.

In this step, as described in the first implementation or the second implementation above, when different spreading sequences are selected for different symbols of the data to be transmitted, different spreading sequences corresponding to respective symbols may be used to spread the data, respectively. As described in the third implementation above, when groups of spreading sequences are selected for respective symbols of the data to be transmitted in units of symbol groups, each spreading sequence in the groups of spreading sequences may be used to spread each corresponding symbol in the groups of symbols, respectively.

In step S503, the UE transmits the spread data to the base station.

It can be seen that, the method for spread spectrum communication according to the embodiments of the present disclosure may enable the user equipment to respectively select spreading sequences in the set of spreading sequences for the plurality of symbols of the data to be transmitted, and ensure that spreading sequences for at least two symbols are different, so as to minimize continuous collision and interference between spread data transmitted by different user equipment, which facilitates correct reception and de-spreading of the received spread data by the base station, reduces a block error rate of data transmission and improves accuracy of data decoding.

Figure 10:
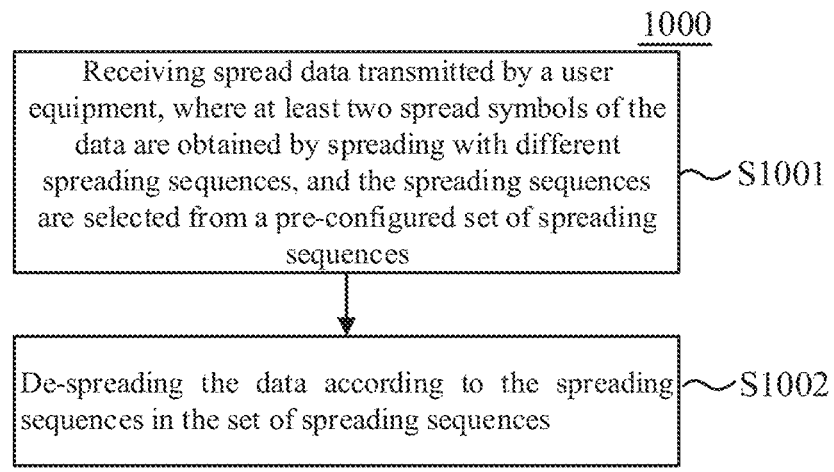
FIG. 10 shows a flowchart of a method for spread spectrum communication according to the embodiments of the present disclosure.

A method for spread spectrum communication performed by a base station according to the embodiments of the present disclosure will be described below with reference to FIG. 10. FIG. 10 shows a flowchart of the method 1000 for spread spectrum communication.

As shown in FIG. 10, in step S1001, spread data transmitted by a user equipment is received, where at least two spread symbols of the data are obtained by spreading with different spreading sequences, and the spreading sequences are selected from a set of spreading sequences.

In this step, at least two spread symbols of the spread data transmitted by the UE and received by the base station are obtained by spreading with different spreading sequences, so as to avoid continuous mutual interference with spread data of other UEs as much as possible. Optionally, the set of spreading sequences may be pre-configured, for example, in the base station and the UE, or may be configured by the base station according to actual conditions and notified to the UE through various signaling, for example, the base station may transmit the set of spreading sequences to the UE through high layer signaling.

In step S1002, the base station de-spreads the data according to the spreading sequences in the set of spreading sequences.

Specifically, corresponding to the foregoing first implementation of the embodiments shown in FIG. 5, the UE randomly selects spreading sequences for the plurality of symbols of the data to be transmitted in the set of spreading sequences, respectively. In this case, the base station may sequentially de-spread, for each spread symbol of the data, with the spreading sequences in the set of spreading sequences until the de-spreading is successful.

For example, in the schematic diagram of the spread data in the first implementation of the embodiments of the present disclosure shown in FIG. 6, UE 1-UE 4 may respectively select, for different symbols of their data, different spreading sequences in the set of spreading sequences including the spreading sequences S1, S2, S3, and S4 to perform spreading. Accordingly, after receiving the spread data of UE 1-UE 4, the base station will sequentially use the spreading sequences S1, S2, S3 and S4 in this set of spreading sequences, respectively, to try to de-spread each spread symbol of UE 1-UE 4, until the data can be successfully de-spread. For example, after UE 1 selects the spreading sequence S3 to spread the third symbol and transmit it to the base station, the base station may try to sequentially use the spreading sequences S1, S2 and S3 in the set of spreading sequences to de-spread the corresponding third spread symbol, and if it is found that the data can be successfully de-spread to obtain the data before spreading when the spreading sequence S3 is used for de-spreading, the de-spreading process is terminated. Certainly, during the specific de-spreading process, it may happen that the base station still cannot successfully de-spread after traversing all spreading sequences, in which case the base station stops to de-spread this symbol after traversing all spreading sequences in the set of spreading sequences.

Corresponding to the foregoing second implementation of the embodiments shown in FIG. 5, the UE may perform spreading by using the selected first spreading sequence for the first symbol in the set of spreading sequences and the hop number. In this case, the base station may sequentially de-spread the spread symbols of the data according to the spreading sequences in the set of spreading sequences and the hop number in the set of hop numbers until the de-spreading is successful. For example, in one example, the base station may de-spread, for the first spread symbol of the data, by using the spreading sequences in the set of spreading sequences sequentially until the de-spreading is successful, and determine the spreading sequence that can successfully de-spread as the first spreading sequence; then determine spreading sequences based on the first spreading sequence by using hop numbers in the set of hop numbers sequentially, de-spread the second spread symbol of the data until the de-spreading is successful, and determine the spreading sequence that can successfully de-spread as the second spreading sequence and the hop number that can successfully de-spread as the hop number for the user equipment, where the hop number represents an offset between spreading sequences in the set of spreading sequences. For example, the hop number may represent an offset between indexes of spreading sequences in the set of spreading sequences. In this example, the set of hop numbers may also be pre-configured, for example, the set of hop numbers may be pre-configured by the base station, or may be configured by the base station and notified to the UE through, for example, signaling and the like (for example, the base station may transmit the set of hop numbers to the UE through high layer signaling), and certainly may also be written into standards in advance. Optionally, the set of spreading sequences and the set of hop numbers may also jointly form a set of spreading sequence resources, which is pre-configured by the base station at the same time. Furthermore, optionally, the first symbol and the second symbol may be two adjacent symbols in a same transport block, or two symbols with a certain interval, which is not limited herein.

By analogy, the base station may continue to de-spread the third spread symbol to the N-th spread symbol according to the determined hop number and the second spreading sequence. Optionally, when the first spreading sequence is the i-th spreading sequence in the set of spreading sequences, the hop number is selected as f, and the total number of spreading sequences in the set of spreading sequences is M, the N-th spreading sequence for the N-th spread symbol may be expressed as the $((i+(N-1) \times f) \mod M+1)$-th spreading sequence. The above description is only an example, and the hop number adopted by the UE for different spread symbols may also be different. For example, the hop number used to select the second spreading sequence for the second symbol may be 1, while the hop number used to select the third spreading sequence for the third symbol may be 3, which is not limited herein.

For example, in the schematic diagram of the spread data in the second implementation of the embodiments of the present disclosure shown in FIG. 7, UE 1-UE 4 select, for different symbols of their data, respective hop numbers and first spreading sequences in the set of spreading sequences including the spreading sequences S1, S2, S3, and S4 and the set of hop numbers including the hop numbers 1 and 3 to perform spreading. Accordingly, after receiving the spread data of UE 1, the base station will de-spread the first spread symbol of UE 1 respectively by using the spreading sequences S1, S2, S3 and S4 in this set of spreading sequences sequentially until the de-spreading is successful, and determine the spreading sequence that can successfully de-spread (for example, the spreading sequence S1) as the first spreading sequence. Then, for the second spread symbol adjacent to the first spread symbol in UE 1, the base station may determine spreading sequences by using the hop numbers 1 and 3 in the set of hop numbers sequentially, for example, determine the spreading sequence S2 by using the hop number 1 and the spreading sequence S4 by using the hop number 3, to de-spread the second spread symbol by using the spreading sequences S2 and S4, respectively. When the spreading sequence S2 can be used for successful de-spreading, the base station determines the spreading sequence S2 as the second spreading sequence, and determines the hop number 1 that can successfully de-spread as the hop number for UE 1. By analogy, the base station may continue to de-spread other spread symbols of UE 1 and other UEs to obtain de-spread data.

In another example of the second implementation, the base station may de-spread the data based on the spreading sequences in the set of spreading sequences and the hop numbers in the set of hop numbers. For example, the base station may traverse combinations of the spreading sequences in the set of spreading sequences and the hop numbers in the set of hop numbers to de-spread one or more spread symbols of the data, respectively, until the de-spreading is successful.

Corresponding to the foregoing third implementation of the embodiments shown in FIG. 5, the set of spreading sequences may include a plurality of groups of spreading sequences, and each group of spreading sequences may include one or more spreading sequences. Optionally, the number of spreading sequences included in these groups of spreading sequences may be the same or different. Under this premise, the UE may select groups of spreading sequences in the set of spreading sequences, and spread the plurality of symbols of the data by using spreading sequences in the selected groups of spreading sequences.

Accordingly, the base station de-spreading the data based on the spreading sequences in the set of spreading sequences may include: de-spreading, for each group of spread symbols of the data, by using the groups of spreading sequences in the set of spreading sequences sequentially, until the de-spreading is successful. Specifically, the base station may firstly de-spread, for a group of symbols consisting of the same number of symbols as spreading sequences included in a group of spreading sequences, by using the groups of spreading sequences in the set of spreading sequences sequentially, and then by analogy, de-spread all groups of symbols in the received data. For example, when each group of spreading sequences in the set of spreading sequences includes 4 spreading sequences, the base station may use each spreading sequence in the selected groups of spreading sequences, respectively, to try to de-spread the received data in units of 4 spread symbols. Certainly, after the base station has de-spread some symbols of the data, it may continue to use the same group of spreading sequences to de-spread other groups of symbols, or it may use a different group of spreading sequences to de-spread other groups of symbols. The specific manner for selecting groups of spreading sequences and the de-spreading manner are not limited herein.

For example, in the schematic diagram of the spread data in the third implementation of the embodiments of the present disclosure shown in FIG. 8, the set of spreading sequences includes at least 5 groups of spreading sequences, and each group of spreading sequences includes 3 spreading sequences. UE 1-UE 4 select among these groups of spreading sequences to spread data. Accordingly, after receiving the spread data of UE 1, the base station will use the spreading sequence groups 1, 2, 3, 4 and 5 in this set of spreading sequences sequentially to de-spread a group of symbols of UE 1 including three spread symbols, respectively, until they can be successfully de-spread. After de-spreading, the base station may also try to perform de-spreading for another group of symbols including three spread symbols by using the same or a different group of spreading sequences as before.

Optionally, on the basis of the foregoing third implementation of the embodiments shown in FIG. 5, in one example, the UE may also use the selected first group of spreading sequences for its first group of symbols in the set of spreading sequences and the selected hop number for spreading, where the first group of symbols may be the first group of symbols in the data to be transmitted by the UE, or may be a group of symbols arbitrarily designated by the UE, and optionally, the number of symbols included in the first group of symbols may be the same as the number of spreading sequences included in one or more groups of spreading sequences in the set of spreading sequences. In this case, the base station sequentially de-spreads groups of spread symbols of the data according to the groups of spreading sequences in the set of spreading sequences and the hop numbers in the set of hop numbers, until the de-spreading is successful. For example, the base station may de-spread, for the first group of spread symbols of the data, by using the groups of spreading sequences in the set of spreading sequences sequentially until the de-spreading is successful, and determine the group of spreading sequences that can successfully de-spread as the first group of spreading sequences; then determine groups of spreading sequences based on the first group of spreading sequences by using the hop numbers in the set of hop numbers sequentially, de-spread the second group of spread symbols of the data until it is successfully de-spread, and determine the group of spreading sequences that can successfully de-spread as the second group of spreading sequences and the hop number that can successfully de-spread as the hop number for the user equipment, where the hop number represents an offset between groups of spreading sequences in the set of spreading sequences. In this example, the set of hop numbers may also be pre-configured, for example, the set of hop numbers may be pre-configured by the base station, or may be configured by the base station and notified to the UE through, for example, signaling and the like, and certainly may also be written into standards in advance. Optionally, the set of spreading sequences and the set of hop numbers may also jointly form a set of spreading sequence resources, which is pre-configured by the base station at the same time. Furthermore, optionally, the first group of symbols and the second group of symbols may be two adjacent groups of symbols in a same transport block, or two groups of symbols with a certain interval, which is not limited herein. By analogy, the base station may continue to de-spread the third group of spread symbols to the N-th group of spread symbols according to the determined hop number and the second group of spreading sequences.

For example, in another schematic diagram of the spread data in the third implementation of the embodiments of the present disclosure shown in FIG. 9, on the basis of the embodiment shown in FIG. 8, UE 1 selects the first group of spreading sequences as the spreading sequence group S1, and selects the hop number as 1. Thus, UE 1 may perform spreading, for the first group of symbols including three symbols, by using each spreading sequence in the spreading sequence group S1, respectively; and then may perform spreading, for the second group of symbols adjacent to the first group of symbols, by using the spreading sequence group S2 according to the selected hop number, and so on. Accordingly, after receiving the spread data of UE 1, the base station will use the spreading sequence groups 1, 2, 3, 4 and 5 in this set of spreading sequences sequentially to de-spread the first group of symbols of UE 1, respectively, until they can be successfully de-spread, and determine the group of spreading sequences that can successfully de-spread (for example, the spreading sequence group 1) as the first group of spreading sequences. Then, for the second group of spread symbols adjacent to the first group of spread symbols of UE 1, the base station determines groups of spreading sequences by using the hop numbers 1, 3 in the set of hop numbers sequentially, for example, determines the spreading sequences group 2 by using the hop number 1 and the spreading sequence group 4 by using the hop number 3, so as to de-spread the second group of spread symbols by using the spreading sequence groups 2 and 4, respectively. When the spreading sequence group 2 can be used for successful de-spreading, the base station determines the spreading sequence group 2 as the second group of spreading sequences, and determines the hop number 1 that can successfully de-spread as the hop number for UE 1. By analogy, the base station may continue to de-spread other groups of spread symbols of UE 1 and other UEs to obtain de-spread data.

In yet another example based on the third implementation, the base station may de-spread the data based on the groups of spreading sequences in the set of spreading sequences and the hop numbers in the set of hop numbers. For example, the base station may traverse combinations of the groups of spreading sequences in the set of spreading sequences and the hop numbers in the set of hop numbers to de-spread one or more spread symbols of the data, respectively, until the de-spreading is successful.

It can be seen that, the method for spread spectrum communication according to the embodiments of the present disclosure may enable the user equipment to respectively select spreading sequences in the set of spreading sequences for the plurality of symbols of the data to be transmitted, and ensure that spreading sequences for at least two symbols are different, so as to minimize continuous collision and interference between spread data transmitted by different user equipment, which facilitates correct reception and de-spreading of the received spread data by the base station, reduces a block error rate of data transmission and improves accuracy of data decoding.

A UE according to the embodiments of the present application will be described below with reference to FIG. 11. The UE may perform the above-mentioned method for spread spectrum communication. Since operations of the UE are substantially the same as the steps of the method for spread spectrum communication described above, the operations will be merely described briefly herein, and repeated description of the same content is omitted.

Figure 11:
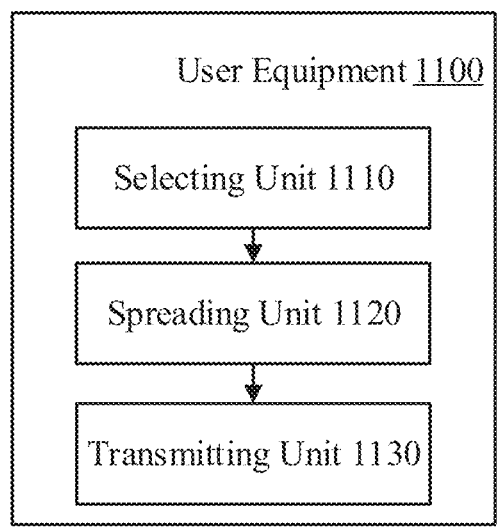
FIG. 11 shows a structural block diagram of a UE according to the embodiments of the present disclosure.

As shown in FIG. 11, the UE 1100 comprises a selecting unit 1110, a spreading unit 1120, and a transmitting unit 1130. It should be appreciated that FIG. 11 only shows components related to the embodiments of the present application, and other components are omitted, but this is only schematic, and the UE 1100 may comprise other components as needed.

The selecting unit 1110 selects spreading sequences in a set of spreading sequences for a plurality of symbols of data to be transmitted, where spreading sequences selected for at least two symbols are different.

The selecting unit 1110 may select respective spreading sequences for different symbols of the data to be transmitted, so as to avoid continuous mutual interference with spread data of other UEs as much as possible. Specifically, at least two different spreading sequences may be selected so that spreading sequences for at least two symbols are different. As described above, the set of spreading sequences may be pre-configured, for example, in the base station and the UE, or may be configured by the base station according to actual conditions and notified to the UE through various signaling, for example, the base station may transmit the set of spreading sequences to the UE through high layer signaling.

Specifically, in a first implementation, the selecting unit 1110 may randomly select spreading sequences for the plurality of symbols of the data to be transmitted in the set of spreading sequences, respectively. In this case, the selecting unit 1110 of the UE randomly selects spreading sequences for at least two symbols of the data to be transmitted, respectively, and ensures that the spreading sequences for the at least two symbols are different.

FIG. 6 shows a schematic diagram of the UE selecting spreading sequences via the selecting unit 1100 to perform spreading in the first implementation of the embodiments of the present disclosure. As shown in FIG. 6, in the set of spreading sequences including the spreading sequences S1, S2, S3, and S4, UE 1-UE 4 may respectively select different spreading sequences for different symbols of their data for spreading. For example, as a result of a random selection, the selecting unit of UE 1 may select the spreading sequence S1 for its first symbol for spreading, and the spreading sequence S2 for its second symbol for spreading, and so on. In addition, the selecting unit of UE 2 may select the spreading sequence S2 for a first symbol for spreading, and the spreading sequence S3 for a second symbol for spreading. Therefore, spreading sequences used for respective symbols of respective UEs are randomly selected. In this way, continuous interference such as that between the spread data of UE 3 and UE 4 as shown in FIG. 4 mentioned above may be avoided as much as possible, and interference of different spread symbols in the data of UE 4, for example, may be dispersed between different users equipment. It can be seen from FIG. 6 that even though a first symbol of UE 4 and a first symbol of UE 1 select a same spreading sequence, and thus interference is generated between their spread symbols, there is no longer interference between second spread symbols of UE 1 and UE 4 because the spreading sequence S3 is randomly selected for the second symbol of UE 1 and the spreading sequence S3 is randomly selected for the second symbol of UE 4. On the contrary, the second spread symbol of UE 4 changes to interfere with UE 2, so that interference between data transmitted by different user equipment may be randomized to facilitate reception and de-spreading of the data by the base station.

In a second implementation, the selecting unit 1100 of the UE may firstly select a first spreading sequence for a first symbol in the set of spreading sequences, where the first symbol may be the first symbol in the data to be transmitted by the UE, and may also be a symbol designated arbitrarily by the UE; then determine a second spreading sequence for its second symbol in the set of spreading sequences based on the first spreading sequence for the first symbol and a hop number for the user equipment selected in a set of hop numbers, where the hop number represents an offset between spreading sequences in the set of spreading sequences. For example, the hop number may represent an offset between indexes of spreading sequences in the set of spreading sequences. Specifically, the first spreading sequence for the first symbol may be randomly selected by the selecting unit 1100 in the set of spreading sequences, and the hop number may also be randomly selected by the selecting unit 1100 in the set of hop numbers. The set of hop numbers may also be pre-configured, for example, the set of hop numbers may be pre-configured by the base station, or may be configured by the base station and notified to the UE through, for example, signaling and the like (for example, the base station may transmit the set of hop numbers to the UE through high layer signaling), and certainly may also be written into standards in advance. Optionally, the set of spreading sequences and the set of hop numbers may also jointly form a set of spreading sequence resources, which is pre-configured by the base station at the same time. When the selecting unit 1100 determines the first spreading sequence for the first symbol and the hop number, the second spreading sequence in the set of spreading sequences may be determined accordingly. Specifically, the second spreading sequence may be determined according to an offset of the first spreading sequence in the set of spreading sequences indicated by the hop number, that is, the position of the first spreading sequence in the set of spreading sequences is shifted by the offset indicated by the hop number, and a spreading sequence at the position after the shift in the set of spreading sequences is determined as the second spreading sequence. Furthermore, optionally, the first symbol and the second symbol may be two adjacent symbols in a same transport block, or two symbols with a certain interval, which is not limited herein.

Furthermore, after determining the first spreading sequence for the first symbol and the second spreading sequence for the second symbol, the selecting unit 1100 may continue to determine, in a similar manner with the second symbol, a third spreading sequence to a N-th spreading sequence for a third symbol to a N-th symbol for spreading. For example, the UE may continue to determine the third spreading sequence for the third symbol by using the second spreading sequence and the hop number previously selected, and so on, until the N-th spreading sequence for the N-th symbol is determined. Optionally, when the first spreading sequence is the i-th spreading sequence in the set of spreading sequences, the hop number is selected as f, and the total number of spreading sequences in the set of spreading sequences is M, the N-th spreading sequence for the N-th symbol may be expressed as, for example, the ((i+(N−1)× f)mod M+1)-th spreading sequence. The above description is only an example, and the hop number adopted by the UE for different symbols may also be different, for example, the hop number used to select the second spreading sequence for the second symbol may be 1, and the hop number used to select the third spreading sequence for the third symbol may be 3, which is not limited herein.

FIG. 7 shows a schematic diagram of the UE selecting spreading sequences and a hop number with the selecting unit 1100 to perform spreading in the second implementation of the embodiments of the present disclosure. As shown in FIG. 7, in the set of spreading sequences including spreading sequences S1, S2, S3, and S4 and the set of hop numbers including hop numbers 1 and 3, UE 1-UE 4 all can select their respective hop numbers, and select their respective spreading sequences for their first symbols for spreading. For example, the hop number selected by UE 1 is 1, and the first spreading sequence selected for the first symbol is S1; the hop number selected by UE 2 is 1, and the first spreading sequence selected for the first symbol is S2; the hop number selected by UE 3 is 1, and the first spreading sequence selected for the first symbol is S3; the hop number selected by UE 4 is 3, and the first spreading sequence selected for the first symbol is S1. In this case, spread data of UE 1-UE 4 is shown in FIG. 6. It can be seen that although UE 1 and UE 4 both select the same first spreading sequence S1 for their first symbols, the second symbols have no interference due to the different hop numbers selected by UE 1 and UE 4, and thus continuous interference between spread data of UE 1 and UE 4 may be avoided as much as possible, so that interference between data transmitted by different user equipment may be randomized to facilitate reception and de-spreading of the data by the base station.

In a third implementation, the set of spreading sequences may include a plurality of groups of spreading sequences, and each group of spreading sequences may include one or more spreading sequences. Optionally, the number of spreading sequences included in these groups of spreading sequences may be the same or different. Under this premise, the selecting unit 1100 may select groups of spreading sequences in the set of spreading sequences, and spread the plurality of symbols of the data by using spreading sequences in the selected groups of spreading sequences.

Specifically, the selecting unit 1100 may firstly use each spreading sequence in the groups of spreading sequences, respectively, to spread symbols with the same number as the number of spreading sequences included in a group of spreading sequences in the set of spreading sequences, and then perform spreading for each symbol of the data to be transmitted similarly. For example, when each group of spreading sequences in the set of spreading sequences includes 4 spreading sequences, the UE may use each spreading sequence in the selected groups of spreading sequences, respectively, to spread the data to be transmitted in units of 4 symbols, until all symbols are spread. Certainly, after the UE uses a certain selected group of spreading sequences to spread some symbols of the data, it may continue to use the same group of spreading sequences to spread other symbols, or it may reselect a different group of spreading sequences to spread other symbols. The specific manner for selecting groups of spreading sequences and the spreading manner are not limited herein.

FIG. 8 shows a schematic diagram of the UE selecting groups of spreading sequences with the selecting unit 1100 to perform spreading in the third implementation of the embodiments of the present disclosure. As shown in FIG. 8, the set of spreading sequences includes at least 5 groups of spreading sequence, and each group of spreading sequences includes 3 spreading sequences. UE 1-UE 4 will select among these groups of spreading sequences to spread data. Specifically, UE 1 selects a spreading sequence group 1, and uses spreading sequences S1, S2, and S3 thereof to spread the first symbol to the third symbol of its data, and then, UE 1 continues to use the spreading sequence group 1 to spread the other symbols of its data in groups of three symbols, and obtains the final spread data. In a similar manner, UE 2-UE 4 select a spreading sequence group 2, a spreading sequence group 3 and a spreading sequence group 4 respectively for spreading. It can be seen that this spreading manner may avoid continuous interference between spread data of different UEs as much as possible, so that interference is randomized to facilitate reception and de-spreading of the data at the base station side.

Optionally, on the basis of the third implementation, the selecting unit 1100 may also select a first group of spreading sequences for its first group of symbols in the set of spreading sequences, where the first group of symbols may be the first group of symbols in the data to be transmitted by the UE, or may be a group of symbols arbitrarily designated by the UE, and optionally, the number of symbols included in the first group of symbols may be the same as the number of spreading sequences included in one or more groups of spreading sequences in the set of spreading sequences; determine a second group of spreading sequences for its second group of symbols in the set of spreading sequences based on the first group of spreading sequences for the first group of symbols and a hop number for the user equipment selected in a set of hop numbers, where the hop number represents an offset between groups of spreading sequences in the set of spreading sequences. Specifically, the first group of spreading sequences for the first group of symbols may be randomly selected by the UE in a pre-configured set of spreading sequences, and the hop number may also be randomly selected by the UE in the set of hop numbers. The set of hop numbers may also be pre-configured, for example, the set of hop numbers may be pre-configured by the base station, or may be configured by the base station and notified to the UE through, for example, signaling and the like, and certainly may also be written into standards in advance. Optionally, the set of spreading sequences and the set of hop numbers may also jointly form a set of spreading sequence resources, which is pre-configured by the base station at the same time. When the UE determines the first groups of spreading sequences for the first group of symbols and the hop number, the second group of spreading sequences in the set of spreading sequences may be determined accordingly. Specifically, the second group of spreading sequences may be determined according to an offset of the first group of spreading sequences in the set of spreading sequences indicated by the hop number, that is, the position of the first group of spreading sequences in the set of spreading sequences is shifted by the offset indicated by the hop number, and a group of spreading sequences at the position after the shift in the set of spreading sequences is determined as the second group of spreading sequences. Furthermore, optionally, the first group of symbols and the second group of symbols may be two adjacent groups of symbols in a same transport block, or two groups of symbols with a certain interval, which is not limited herein.

Furthermore, after determining the first group of spreading sequences for the first group of symbols and the second group of spreading sequences for the second group of symbols, the selecting unit 1100 may continue to determine, in a similar manner with the second group of symbols, a third group of spreading sequences to a N-th group of spreading sequences for a third group of symbols to a N-th group of symbols for spreading. For example, the UE may continue to determine the third group of spreading sequences for the third group of symbols by using the second group of spreading sequences and the hop number previously selected, and so on, until the N-th group of spreading sequences for the N-th group of symbols is determined. In addition, the hop number adopted by the selecting unit 1100 for different groups of symbols may also be different, for example, the hop number used to select the second group of spreading sequences for the second group of symbols may be 1, and the hop number used to select the third group of spreading sequences for the third group of symbols may be 2, which is not limited herein.

FIG. 9 shows a schematic diagram of another example of the UE selecting groups of spreading sequences and a hop number with the selecting unit 1100 to perform spreading in the third implementation of the embodiments of the present disclosure. On the basis of the embodiment shown in FIG. 8 and referring to FIG. 9, the selecting unit of UE 1 may select the first group of spreading sequences as the spreading sequence group S1 and the hop number as 1. On this basis, UE 1 may perform spreading, for the first group of symbols including three symbols, by using each spreading sequence in the spreading sequence group S1, and then perform spreading, for the second group of symbols adjacent to the first group of symbols, by using the spreading sequence group S2 according to the selected hop number, and so on. The spreading manner for the data to be transmitted by the UE in FIG. 9 is only an example, and spreading sequences may be selected by using randomly selected groups of spreading sequences and hop number to spread the data, which is not limited herein.

The spreading unit 1120 spread the data by using the selected spreading sequences.

As described in the first implementation or the second implementation above, when different spreading sequences are selected for different symbols of the data to be transmitted, the spreading unit 1120 may spread the data by using different spreading sequences corresponding to respective symbols, respectively. As described in the third implementation above, when groups of spreading sequences are selected for respective symbols of the data to be transmitted in units of symbol groups, the spreading unit 1120 may spread each corresponding symbol in the groups of symbols, respectively, by using each spreading sequence in the groups of spreading sequences.

The transmitting unit 1130 transmits the spread data to the base station.

It can be seen that, the user equipment according to the embodiments of the present disclosure may enable the user equipment to respectively select spreading sequences in the set of spreading sequences for the plurality of symbols of the data to be transmitted, and ensure that spreading sequences for at least two symbols are different, so as to minimize continuous collision and interference between spread data transmitted by different user equipment, which facilitates correct reception and de-spreading of the received spread data by the base station, reduces a block error rate of data transmission and improves accuracy of data decoding.

A base station according to the embodiments of the present application will be described below with reference to FIG. 12. The base station may perform the above-mentioned method for spread spectrum communication. Since operations of the base station are substantially the same as the steps of the method for spread spectrum communication described above, the operations will be merely described briefly herein, and repeated description of the same content is omitted.

Figure 12:
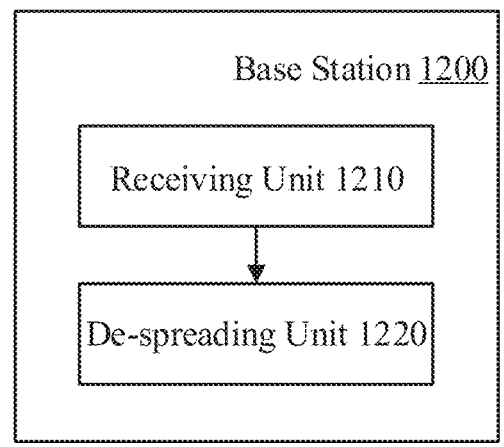
FIG. 12 shows a structural block diagram of a base station according to the embodiments of the present disclosure.

As shown in FIG. 12, the base station 1200 comprises a receiving unit 1210 and de-spreading unit 1220. It should be appreciated that FIG. 12 only shows components related to the embodiments of the present application, and other components are omitted, but this is only schematic, and the base station 1200 may comprise other components as needed.

The receiving unit receives spread data transmitted by a user equipment, where at least two spread symbols of the data are obtained by spreading with different spreading sequences, and the spreading sequences are selected from a set of spreading sequences.

At least two spread symbols of the spread data transmitted by the UE and received by the receiving unit 1210 are obtained by spreading with different spreading sequences, so as to avoid continuous mutual interference with spread data of other UEs as much as possible. Optionally, the set of spreading sequences may be pre-configured, for example, in the base station and the UE, or may be configured by the base station according to actual conditions and notified to the UE through various signaling, for example, the base station may transmit the set of spreading sequences to the UE through high layer signaling.

The de-spreading unit 1220 de-spreads the data according to the spreading sequences in the set of spreading sequences.

Specifically, corresponding to the foregoing first implementation of the embodiments shown in FIG. 5, the UE randomly selects spreading sequences for the plurality of symbols of the data to be transmitted in the set of spreading sequences, respectively. In this case, the de-spreading unit 1220 may sequentially de-spread, for each spread symbol of the data, with the spreading sequences in the set of spreading sequences until the de-spreading is successful.

For example, in the schematic diagram of the spread data in the first implementation of the embodiments of the present disclosure shown in FIG. 6, UE 1-UE 4 may respectively select, for different symbols of their data, different spreading sequences in the set of spreading sequences including the spreading sequences S1, S2, S3, and S4 to perform spreading. Accordingly, after receiving the spread data of UE 1-UE 4, the de-spreading unit 1220 will sequentially use the spreading sequences S1, S2, S3 and S4 in this set of spreading sequences, respectively, to try to de-spread each spread symbol of UE 1-UE 4, until the data can be successfully de-spread. For example, after UE 1 selects the spreading sequence S3 to spread the third symbol and transmit it to the base station, the de-spreading unit 1220 may try to sequentially use the spreading sequences S1, S2 and S3 in the set of spreading sequences to de-spread the corresponding third spread symbol, and if it is found that the data can be successfully de-spread to obtain the data before spreading when the spreading sequence S3 is used for de-spreading, the de-spreading process is terminated. Certainly, during the specific de-spreading process, it may happen that the de-spreading unit 1220 still cannot successfully de-spread after traversing all spreading sequences, in which case the base station stops to de-spread this symbol after traversing all spreading sequences in the set of spreading sequences.

Corresponding to the foregoing second implementation of the embodiments shown in FIG. 5, the UE may perform spreading by using the selected first spreading sequence for the first symbol in the set of spreading sequences and the hop number. In this case, the de-spreading unit 1220 may sequentially de-spread the spread symbols of the data according to the spreading sequences in the set of spreading sequences and the hop number in the set of hop numbers until the de-spreading is successful. For example, in one example, the de-spreading unit 1220 may de-spread, for the first spread symbol of the data, by using the spreading sequences in the set of spreading sequences sequentially until the de-spreading is successful, and determine the spreading sequence that can successfully de-spread as the first spreading sequence; then determine spreading sequences based on the first spreading sequence by using hop numbers in the set of hop numbers sequentially, de-spread the second spread symbol of the data until the de-spreading is successful, and determine the spreading sequence that can successfully de-spread as the second spreading sequence and the hop number that can successfully de-spread as the hop number for the user equipment, where the hop number represents an offset between spreading sequences in the set of spreading sequences. For example, the hop number may represent an offset between indexes of spreading sequences in the set of spreading sequences. In this example, the set of hop numbers may also be pre-configured, for example, the set of hop numbers may be pre-configured by the base station, or may be configured by the base station and notified to the UE through, for example, signaling and the like (for example, the base station may transmit the set of hop numbers to the UE through high layer signaling), and certainly may also be written into standards in advance. Optionally, the set of spreading sequences and the set of hop numbers may also jointly form a set of spreading sequence resources, which is pre-configured by the base station at the same time. Furthermore, optionally, the first symbol and the second symbol may be two adjacent symbols in a same transport block, or two symbols with a certain interval, which is not limited herein.

By analogy, the de-spreading unit 1220 may continue to de-spread the third spread symbol to the N-th spread symbol according to the determined hop number and the second spreading sequence. Optionally, when the first spreading sequence is the i-th spreading sequence in the set of spreading sequences, the hop number is selected as f, and the total number of spreading sequences in the set of spreading sequences is M, the N-th spreading sequence for the N-th spread symbol may be expressed as the $((i+(N-1)\times f) \bmod M+1)$-th spreading sequence. The above description is only an example, and the hop number adopted by the UE for different spread symbols may also be different. For example, the hop number used to select the second spreading sequence for the second symbol may be 1, while the hop number used to select the third spreading sequence for the third symbol may be 3, which is not limited herein.

For example, in the schematic diagram of the spread data in the second implementation of the embodiments of the present disclosure shown in FIG. 7, UE 1-UE 4 select, for different symbols of their data, respective hop numbers and first spreading sequences in the set of spreading sequences including the spreading sequences S1, S2, S3, and S4 and the set of hop numbers including the hop numbers 1 and 3 to perform spreading. Accordingly, after receiving the spread data of UE 1, the de-spreading unit 1220 will de-spread the first spread symbol of UE 1 respectively by using the spreading sequences S1, S2, S3 and S4 in this set of spreading sequences sequentially until the de-spreading is successful, and determine the spreading sequence that can successfully de-spread (for example, the spreading sequence S1) as the first spreading sequence. Then, for the second spread symbol adjacent to the first spread symbol in UE 1, the base station may determine spreading sequences by using the hop numbers 1 and 3 in the set of hop numbers sequentially, for example, determine the spreading sequence S2 by using the hop number 1 and the spreading sequence S4 by using the hop number 3, to de-spread the second spread symbol by using the spreading sequences S2 and S4, respectively. When the spreading sequence S2 can be used for successful de-spreading, the base station determines the spreading sequence S2 as the second spreading sequence, and determines the hop number 1 that can successfully de-spread as the hop number for UE 1. By analogy, the base station may continue to de-spread other spread symbols of UE 1 and other UEs to obtain de-spread data.

In another example of the second implementation, the de-spreading unit 1220 may de-spread the data based on the spreading sequences in the set of spreading sequences and the hop numbers in the set of hop numbers. For example, the de-spreading unit 1220 may traverse combinations of the spreading sequences in the set of spreading sequences and the hop numbers in the set of hop numbers to de-spread one or more spread symbols of the data, respectively, until the de-spreading is successful.

Corresponding to the foregoing third implementation of the embodiments shown in FIG. 5, the set of spreading sequences may include a plurality of groups of spreading sequences, and each group of spreading sequences may include one or more spreading sequences. Optionally, the number of spreading sequences included in these groups of spreading sequences may be the same or different. Under this premise, the UE may select groups of spreading sequences in the set of spreading sequences, and spread the plurality of symbols of the data by using spreading sequences in the selected groups of spreading sequences.

Accordingly, the de-spreading unit 1220 de-spreading the data based on the spreading sequences in the set of spreading sequences may include: de-spreading, for each group of spread symbols of the data, by using the groups of spreading sequences in the set of spreading sequences sequentially, until the de-spreading is successful. Specifically, the base station may firstly de-spread, for a group of symbols consisting of the same number of symbols as spreading sequences included in a group of spreading sequences, by using the groups of spreading sequences in the set of spreading sequences sequentially, and then by analogy, de-spread all groups of symbols in the received data. For example, when each group of spreading sequences in the set of spreading sequences includes 4 spreading sequences, the base station may use each spreading sequence in the selected groups of spreading sequences, respectively, to try to de-spread the received data in units of 4 spread symbols. Certainly, after the base station has de-spread some symbols of the data, it may continue to use the same group of spreading sequences to de-spread other groups of symbols, or it may use a different group of spreading sequences to de-spread other groups of symbols. The specific manner for selecting groups of spreading sequences and the de-spreading manner are not limited herein.

For example, in the schematic diagram of the spread data in the third implementation of the embodiments of the present disclosure shown in FIG. 8, the set of spreading sequences includes at least 5 groups of spreading sequences, and each group of spreading sequences includes 3 spreading sequences. UE 1-UE 4 select among these groups of spreading sequences to spread data. Accordingly, after receiving the spread data of UE 1, the de-spreading unit 1220 will use the spreading sequence groups 1, 2, 3, 4 and 5 in this set of spreading sequences sequentially to de-spread a group of symbols of UE 1 including three spread symbols, respectively, until they can be successfully de-spread. After de-spreading, the base station may also try to perform de-spreading for another group of symbols including three spread symbols by using the same or a different group of spreading sequences as before.

Optionally, on the basis of the foregoing third implementation of the embodiments shown in FIG. 5, in one example, the UE may also use the selected first group of spreading sequences for its first group of symbols in the set of spreading sequences and the selected hop number for spreading, where the first group of symbols may be the first group of symbols in the data to be transmitted by the UE, or may be a group of symbols arbitrarily designated by the UE, and optionally, the number of symbols included in the first group of symbols may be the same as the number of spreading sequences included in one or more groups of spreading sequences in the set of spreading sequences. In this case, the de-spreading unit 1220 sequentially de-spreads groups of spread symbols of the data according to the groups of spreading sequences in the set of spreading sequences and the hop numbers in the set of hop numbers, until the de-spreading is successful. For example, the de-spreading unit 1220 may de-spread, for the first group of spread symbols of the data, by using the groups of spreading sequences in the set of spreading sequences sequentially until the de-spreading is successful, and determine the group of spreading sequences that can successfully de-spread as the first group of spreading sequences; then determine groups of spreading sequences based on the first group of spreading sequences by using the hop numbers in the set of hop numbers sequentially, de-spread the second group of spread symbols of the data until it is successfully de-spread, and determine the group of spreading sequences that can successfully de-spread as the second group of spreading sequences and the hop number that can successfully de-spread as the hop number for the user equipment, where the hop number represents an offset between groups of spreading sequences in the set of spreading sequences. In this example, the set of hop numbers may also be pre-configured, for example, the set of hop numbers may be pre-configured by the base station, or may be configured by the base station and notified to the UE through, for example, signaling and the like, and certainly may also be written into standards in advance. Optionally, the set of spreading sequences and the set of hop numbers may also jointly form a set of spreading sequence resources, which is pre-configured by the base station at the same time. Furthermore, optionally, the first group of symbols and the second group of symbols may be two adjacent groups of symbols in a same transport block, or two groups of symbols with a certain interval, which is not limited herein. By analogy, the base station may continue to de-spread the third group of spread symbols to the N-th group of spread symbols according to the determined hop number and the second group of spreading sequences.

For example, in another schematic diagram of the spread data in the third implementation of the embodiments of the present disclosure shown in FIG. 9, on the basis of the embodiment shown in FIG. 8, UE 1 selects the first group of spreading sequences as the spreading sequence group S1 and the hop number as 1. Thus, UE 1 may perform spreading, for the first group of symbols including three symbols, by using each spreading sequence in the spreading sequence group S1, respectively; and then may perform spreading, for the second group of symbols adjacent to the first group of symbols, by using the spreading sequence group S2 according to the selected hop number, and so on. Accordingly, after receiving the spread data of UE 1, the de-spreading unit 1220 will use the spreading sequence groups 1, 2, 3, 4 and 5 in this set of spreading sequences sequentially to de-spread the first group of symbols of UE 1, respectively, until they can be successfully de-spread, and determine the group of spreading sequences that can successfully de-spread (for example, the spreading sequence group 1) as the first group of spreading sequences. Then, for the second group of spread symbols adjacent to the first group of spread symbols of UE 1, the base station determines groups of spreading sequences by using the hop numbers 1, 3 in the set of hop numbers sequentially, for example, determines the spreading sequences group 2 by using the hop number 1 and the spreading sequence group 4 by using the hop number 3, so as to de-spread the second group of spread symbols by using the spreading sequence groups 2 and 4, respectively. When the spreading sequence group 2 can be used for successful de-spreading, the base station determines the spreading sequence group 2 as the second group of spreading sequences, and determines the hop number 1 that can successfully de-spread as the hop number for UE 1. By analogy, the base station may continue to de-spread other groups of spread symbols of UE 1 and other UEs to obtain de-spread data.

In yet another example based on the third implementation, the de-spreading unit 1220 may de-spread the data based on the groups of spreading sequences in the set of spreading sequences and the hop numbers in the set of hop numbers. For example, the de-spreading unit 1220 may traverse combinations of the groups of spreading sequences in the set of spreading sequences and the hop numbers in the set of hop numbers to de-spread one or more spread symbols of the data, respectively, until the de-spreading is successful.

It can be seen that, the base station according to the embodiments of the present disclosure may enable the user equipment to respectively select spreading sequences in the set of spreading sequences for the plurality of symbols of the data to be transmitted, and ensure that spreading sequences for at least two symbols are different, so as to minimize continuous collision and interference between spread data transmitted by different user equipment, which facilitates correct reception and de-spreading of the received spread data by the base station, reduces a block error rate of data transmission and improves accuracy of data decoding.

<Hardware Structure>

Figure 13:
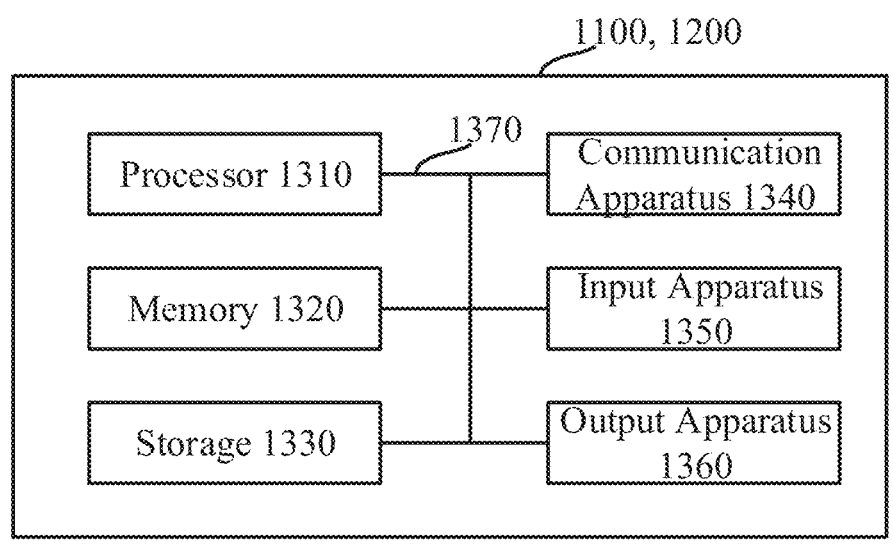
FIG. 13 is a diagram illustrating an example of a hardware structure of a user equipment or a base station involved in one embodiment of the present disclosure.

A user terminal and the like in one embodiment of the present disclosure may function as a computer that executes the processes of the wireless communication method of the present disclosure. FIG. 13 is a schematic diagram of a hardware structure of a base station and a user terminal involved in one embodiment of the present disclosure. The user terminal 1100 and the base station 1200 described above may be constituted as a computer apparatus that physically comprises a processor 1310, a memory 1320, a storage 1330, a communication apparatus 1340, an input apparatus 1350, an output apparatus 1360, a bus 1370 and the like In addition, in the following description, terms such as "apparatus" may be replaced with circuits, devices, units, and the like. The hardware structure of the user terminal 1100 and the base station 1200 may include one or more of the respective apparatuses shown in the figure, or may not include a part of the apparatuses.

For example, only one processor 1310 is illustrated, but there may be a plurality of processors. Furthermore, processes may be performed by one processor, or processes may be performed by more than one processor simultaneously, sequentially, or by other methods. In addition, the processor 1310 may be installed by more than one chip.

Respective functions of the user terminal 1100 and the base station 1200 may be implemented, for example, by reading specified software (program) on hardware such as the processor 1310 and the memory 1320, so that the processor 1310 performs computations, controls communication performed by the communication apparatus 1340, and controls reading and/or writing of data in the memory 1320 and the storage 1330.

The processor 1310, for example, operates an operating system to control the entire computer. The processor 1310 may be constituted by a Central Processing Unit (CPU), which includes interfaces with peripheral apparatuses, a control apparatus, a computing apparatus, a register and the like.

In addition, the processor 1310 reads programs (program codes), software modules and data from the storage 1330 and/or the communication apparatus 1340 to the memory 1320, and execute various processes according to them. As for the program, a program causing computers to execute at least a part of the operations described in the above embodiments may be employed.

The memory 1320 is a computer-readable recording medium, and may be constituted, for example, by at least one of a Read Only Memory (ROM), an Erasable Programmable ROM (EPROM), an Electrically EPROM (EEPROM), a Random Access Memory (RAM) and other appropriate storage media. The memory 1320 may also be referred to as a register, a cache, a main memory (a main storage apparatus) and the like. The memory 1320 may store executable programs (program codes), software modules and the like for implementing the wireless communication method involved in one embodiment of the present disclosure.

The storage 1330 is a computer-readable recording medium, and may be constituted, for example, by at least one of a flexible disk, a Floppy® disk, a magneto-optical disk (e.g., a Compact Disc ROM (CD-ROM) and the like), a digital versatile disk, a Blu-ray® disk, a removable disk, a hard driver, a smart card, a flash memory device (e.g., a card, a stick and a key driver), a magnetic stripe, a database, a server, and other appropriate storage media. The storage 1330 may also be referred to as an auxiliary storage apparatus.

The communication apparatus 1340 is a hardware (transceiver device) performing communication between computers via a wired and/or wireless network, and is also referred to as a network device, a network controller, a network card, a communication module and the like, for example. The communication apparatus 1340 may include a high-frequency switch, a duplexer, a filter, a frequency synthesizer and the like to implement, for example, Frequency Division Duplex (FDD) and/or Time Division Duplex (TDD).

The input apparatus 1350 is an input device (e.g., a keyboard, a mouse, a microphone, a switch, a button, a sensor and the like) that receives input from the outside. The output apparatus 1360 is an output device (e.g., a display, a speaker, a Light Emitting Diode (LED) light and the like) that performs outputting to the outside. In addition, the input apparatus 1350 and the output apparatus 1360 may also be an integrated structure (e.g., a touch screen).

Furthermore, the respective apparatuses such as the processor 1310 and the memory 1320 are connected by the bus 1370 that communicates information. The bus 1370 may be constituted by a single bus or by different buses between the apparatuses.

Furthermore, the user terminal 1100 and the base station 1200 may comprise hardware such as a microprocessor, a Digital Signal Processor (DSP), an Application Specified Integrated Circuit (ASIC), a Programmable Logic Device (PLD), a Field Programmable Gate Array (FPGA), etc., and the hardware may be used to implement a part of or all of the respective functional blocks. For example, the processor 1310 may be installed by at least one of the hardware.

(Variations)

In addition, the terms illustrated in the present specification and/or the terms required for understanding of the present specification may be substituted with terms having the same or similar meaning. For example, a channel and/or a symbol may also be a signal (signaling). Furthermore, the signal may be a message. A reference signal may be abbreviated as an "RS", and may also be referred to as a "pilot", a "pilot signal" and so on, depending on the standard applied. Furthermore, a component carrier (CC) may also be referred to as a cell, a frequency carrier, a carrier frequency, and the like.

In addition, a radio frame may be composed of one or more periods (frames) in the time domain. Each of the one or more periods (frames) constituting the radio frame may also be referred to as a subframe. Further, a subframe may be composed of one or more slots in the time domain. The subframe may be a fixed length of time duration (e.g., 1 ms) that is independent of the numerology.

Furthermore, a slot may be composed of one or more symbols (OFDM (Orthogonal Frequency Division Multiplexing) symbols, SC-FDMA (Single Carrier Frequency Division Multiple Access) symbols, etc.) in the time domain. Furthermore, the slot may also be a time unit based on the numerology. Furthermore, the slot may also include a plurality of microslots. Each microslot may be composed of one or more symbols in the time domain. Furthermore, a microslot may also be referred to as a "subframe".

A radio frame, a subframe, a slot, a microslot and a symbol all represent a time unit during signal transmission. A radio frame, a subframe, a slot, a microslot and a symbol may also use other names that correspond to thereof, respectively. For example, one subframe may be referred to as a "transmission time interval (TTI)", a plurality of consecutive subframes may also be referred to as a "TTI" and one slot or one microslot may also be referred to as a "TTI." That is, a subframe and/or a TTI may be a subframe (1 ms) in the existing LTE, may be a period of time shorter than 1 ms (e.g., 1 to 13 symbols), or may be a period of time longer than 1 ms. In addition, a unit indicating a TTI may also be referred to as a slot, a microslot and the like instead of a subframe.

Herein, a TTI refers to the minimum time unit of scheduling in wireless communication, for example. For example, in LTE systems, a wireless base station performs scheduling for respective user terminals that allocates radio resources (such as frequency bandwidths and transmission power that can be used in respective user terminals) in units of TTI. In addition, the definition of the TTI is not limited thereto.

The TTI may be a transmission time unit of channel-coded data packets (transport blocks), code blocks, and/or codewords, or may be a processing unit of scheduling, link adaptation and so on. In addition, when the TTI is given, a time interval (e.g., the number of symbols) mapped to transport blocks, code blocks, and/or codewords actually may also be shorter than the TTI.

In addition, when one slot or one microslot is called a TTI, more than one TTI (i.e., more than one slot or more than one microslot) may also become the minimum time unit of scheduling. Furthermore, the number of slots (the number of microslots) constituting the minimum time unit of the scheduling may be controlled.

A TTI having a time duration of 1 ms may also be referred to as a normal TTI (TTI in LTE Rel. 8-12), a standard TTI, a long TTI, a normal subframe, a standard subframe, or a long subframe, and so on. A TTI that is shorter than a normal TTI may also be referred to as a compressed TTI, a short TTI, a partial (or fractional) TTI, a compressed subframe, a short subframe, a microslot, a subslot, and so on.

In addition, a long TTI (e.g., a normal TTI, a subframe, etc.) may also be replaced with a TTI having a time duration exceeding 1 ms, and a short TTI (e.g., a compressed TTI, etc.) may also be replaced with a TTI having a TTI duration shorter than the long TTI and longer than 1 ms.

A resource block (RB) is a resource allocation unit in the time domain and the frequency domain, and may include one or more consecutive subcarriers in the frequency domain. Also, an RB may include one or more symbols in the time domain, and may be one slot, one microslot, one subframe or one TTI duration. One TTI and one subframe may be composed of one or more resource blocks, respectively. In addition, one or more RBs may also be referred to as "physical resource blocks (PRBs (Physical RBs))", "Sub-Carrier Groups (SCGs)", "Resource Element Groups (REGs)", "PRG pairs", "RB pairs" and so on.

Furthermore, a resource block may also be composed of one or more resource elements (REs). For example, one RE may be a radio resource area of one subcarrier and one symbol.

In addition, structures of the radio frames, subframes, slots, microslots and symbols, etc. described above are simply examples. For example, configurations such as the number of subframes included in a radio frame, the number of slots of each subframe or radio frame, the number or microslots included in a slot, the number of symbols and RBs included in a slot or microslot, the number of subcarriers included in an RB, the number of symbols in a TTI, the symbol duration and the cyclic prefix (CP) duration may be variously altered.

Furthermore, the information, parameters and so on described in this specification may be represented in absolute values or in relative values with respect to specified values, or may be represented by other corresponding information. For example, radio resources may be indicated by specified indexes. Furthermore, formulas and the like using these parameters may be different from those explicitly disclosed in this specification.

The names used for the parameters and the like in this specification are not limited in any respect. For example, since various channels (Physical Uplink Control Channels (PUCCHs), Physical Downlink Control Channels (PDCCHs), etc.) and information units may be identified by any suitable names, the various names assigned to these various channels and information elements are not limitative in any respect.

The information, signals and the like described in this specification may be represented by using any one of various different technologies. For example, data, instructions, commands, information, signals, bits, symbols, chips, etc. possibly referenced throughout the above description may be represented by voltages, currents, electromagnetic waves, magnetic fields or particles, optical fields or photons, or any combination thereof.

In addition, information, signals and the like may be output from higher layers to lower layers and/or from lower layers to higher layers. Information, signals and the like may be input or output via a plurality of network nodes.

The information, signals and the like that are input or output may be stored in a specific location (for example, in a memory), or may be managed in a control table. The information, signals and the like that are input or output may be overwritten, updated or appended. The information, signals and the like that are output may be deleted. The information, signals and the like that are input may be transmitted to other apparatuses.

Reporting of information is by no means limited to the manners/embodiments described in this specification, and may be implemented by other methods as well. For example, reporting of information may be implemented by using physical layer signaling (for example, downlink control information (DCI), uplink control information (UCI)), higher layer signaling (for example, RRC (Radio Resource Control) signaling, broadcast information (master information blocks (MIBs), system information blocks (SIBs), etc.), MAC (Medium Access Control) signaling), other signals or combinations thereof.

In addition, physical layer signaling may also be referred to as L1/L2 (Layer 1/Layer 2) control information (L1/L2 control signals), L1 control information (L1 control signal) and the like. Furthermore, RRC signaling may also be referred to as "RRC messages", for example, RRC connection setup messages, RRC connection reconfiguration messages, and so on. Furthermore, MAC signaling may be reported by using, for example, MAC control elements (MAC CEs).

Furthermore, notification of prescribed information (for example, notification of "being X") is not limited to being performed explicitly, and may be performed implicitly (for example, by not performing notification of the prescribed information or by notification of other information).

Decision may be performed by a value (0 or 1) represented by 1 bit, or by a true or false value (Boolean value) represented by TRUE or FALSE, or by a numerical comparison (e.g., comparison with a prescribed value).

Software, whether referred to as "software", "firmware", "middleware", "microcode" or "hardware description language", or called by other names, should be interpreted broadly to mean instructions, instruction sets, code, code segments, program codes, programs, subprograms, software modules, applications, software applications, software packages, routines, subroutines, objects, executable files, execution threads, procedures, functions and so on.

In addition, software, commands, information, etc. may be transmitted and received via a transport medium. For example, when software is transmitted from web pages, servers or other remote sources using wired technologies (coaxial cables, fibers, twisted pairs, Digital Subscriber Lines (DSLs), etc.) and/or wireless technologies (infrared ray, microwave, etc.), these wired technologies and/or wireless technologies are included in the definition of the transport medium.

The terms "system" and "network" used in this specification may be used interchangeably.

In this specification, terms like "Base Station (BS)", "wireless base station", "eNB", "gNB", "cell", "sector", "cell group", "carrier" and "component carrier" may be used interchangeably. The base station is sometimes referred to as terms such as a fixed station, a NodeB, an eNodeB (eNB), an access point, a transmitting point, a receiving point, a femto cell, a small cell and the like.

A base station is capable of accommodating one or more (for example, three) cells (also referred to as sectors). In the case where the base station accommodates a plurality of cells, the entire coverage area of the base station may be divided into a plurality of smaller areas, and each smaller area may provide communication services by using a base station sub-system (for example, a small base station for indoor use (a Remote Radio Head (RRH)). Terms like "cell" and "sector" refer to a part of or an entirety of the coverage area of a base station and/or a sub-system of the base station that provides communication services in this coverage.

In this specification, terms such as "Mobile Station (MS)", "user terminal", "User Equipment (UE)", and "terminal" may be used interchangeably. The base station is sometimes referred to as terms such as a fixed station, a NodeB, an eNodeB (eNB), an access point, a transmitting point, a receiving point, a femto cell, a small cell and the like.

The mobile station is sometimes referred by those skilled in the art as a user station, a mobile unit, a user unit, a wireless unit, a remote unit, a mobile device, a wireless device, a wireless communication device, a remote device, a mobile user station, an access terminal, a mobile terminal, a wireless terminal, a remote terminal, a handset, a user agent, a mobile client, a client, or some other appropriate terms.

Furthermore, the wireless base station in this specification may also be replaced with a user terminal. For example, for a structure in which communication between a wireless base station and a user terminal is replaced with communication between a plurality of user terminals (Device-to-Device, D2D), respective manners/embodiments of the present disclosure may also be applied. At this time, functions provided by the above base station 1200 may be regarded as functions provided by the user terminal 800. Furthermore, the words "uplink" and "downlink" may also be replaced with "side". For example, an uplink channel may be replaced with a side channel.

Also, the user terminal in this specification may be replaced with a wireless base station. At this time, functions provided by the above user terminal 1100 may be regarded as functions provided by the wireless base station 1200.

In this specification, specific actions configured to be performed by the base station sometimes may be performed by its upper nodes in certain cases. Obviously, in a network composed of one or more network nodes having base stations, various actions performed for communication with terminals may be performed by the base stations, one or more network nodes other than the base stations (for example, Mobility Management Entities (MMEs), Serving-Gateways (S-GWs), etc., may be considered, but not limited thereto)), or combinations thereof.

The respective manners/embodiments described in this specification may be used individually or in combinations, and may also be switched and used during execution. In addition, orders of processes, sequences, flow charts and so on of the respective manners/embodiments described in this specification may be re-ordered as long as there is no inconsistency. For example, although various methods have been described in this specification with various units of steps in exemplary orders, the specific orders as described are by no means limitative.

The manners/embodiments described in this specification may be applied to systems that utilize Long Term Evolution (LTE), LTE-Advanced (LTE-A), LTE-Beyond (LTE-B), a super 3rd generation mobile communication system (SUPER 3G), Advanced International Mobile Telecommunication (IMT-Advanced), a 4th generation mobile communication system (4G), a 5th generation mobile communication system (5G), Future Radio Access (FRA), New Radio Access Technology (New-RAT), New Radio (NR), New radio access (NX), Future generation radio access (FX), a Global System for Mobile communications (GSM®), CDMA 2000, Ultra Mobile Broadband (UMB), IEEE 802.11 (Wi-Fi®), IEEE 802.16 (WiMAX®), IEEE 802.20, Ultra-Wide Band (UWB), Bluetooth® and other appropriate wireless communication methods, and/or next-generation systems that are enhanced based on them.

Terms such as "based on" as used in this specification do not mean "based on only", unless otherwise specified in other paragraphs. In other words, terms such as "based on" mean both "based on only" and "at least based on."

Any reference to units with designations such as "first", "second" and so on as used in this specification does not generally limit the quantity or order of these units. These designations may be used in this specification as a convenient method for distinguishing between two or more units. Therefore, reference to a first unit and a second unit does not imply that only two units may be employed, or that the first unit must precedes the second unit in several ways.

Terms such as "deciding (determining)" as used in this specification may encompass a wide variety of actions. The "deciding (determining)" may regard, for example, calculating, computing, processing, deriving, investigating, looking up (e.g., looking up in a table, a database or other data structures), ascertaining, etc. as performing the "deciding (determining)". In addition, the "deciding (determining)" may also regard receiving (e.g., receiving information), transmitting (e.g., transmitting information), inputting, outputting accessing (e.g., accessing data in a memory), etc. as performing the "deciding (determining)". In addition, the "deciding (determining)" may further regard resolving, selecting, choosing, establishing, comparing, etc. as performing the "deciding (determining)". That is to say, the "deciding (determining)" may regard certain actions as performing the "deciding (determining)".

As used herein, terms such as "connected", "coupled", or any variation thereof mean any direct or indirect connection or coupling between two or more units, and may include the presence of one or more intermediate units between two units that are "connected" or "coupled" to each other. Coupling or connection between the units may be physical, logical or a combination thereof. For example, "connection" may be replaced with "access." As used in this specification, two units may be considered as being "connected" or "coupled" to each other by using one or more electrical wires, cables and/or printed electrical connections, and, as a number of non-limiting and non-inclusive examples, by using electromagnetic energy having wavelengths in the radio frequency region, microwave region and/or optical (both visible and invisible) region.

When terms such as "including", "comprising" and variations thereof are used in this specification or the claims, these terms, similar to the term "having", are also intended to be inclusive. Furthermore, the term "or" as used in this specification or the claims is not an exclusive or.

Although the present disclosure has been described in detail above, it should be obvious to a person skilled in the art that the present disclosure is by no means limited to the embodiments described in this specification. The present disclosure may be implemented with various modifications and alterations without departing from the spirit and scope of the present disclosure defined by the recitations of the claims. Consequently, the description in this specification is for the purpose of illustration, and does not have any limitative meaning to the present disclosure.

What is claimed is:

1. A user equipment, comprising:
a selecting unit configured to select spreading sequences for a plurality of symbols of data to be transmitted in a set of spreading sequences, respectively, wherein spreading sequences selected for at least two symbols are different;
a spreading unit configured to spread the data by using the selected spreading sequences; and
a transmitting unit configured to transmit the spread data, wherein the selecting unit selects a first spreading sequence for a first symbol in the set of spreading sequences, and
determines a second spreading sequence for a second symbol in the set of spreading sequences based on the first spreading sequence for the first symbol and a hop number for the user equipment selected in a set of hop numbers, wherein the hop number represents an offset between spreading sequences in the set of spreading sequences.

2. The user equipment of claim 1, wherein:
the selecting unit randomly selects spreading sequences for the plurality of symbols of the data to be transmitted in the set of spreading sequences, respectively.

3. The user equipment of claim 1, wherein:
the set of spreading sequences includes a plurality of groups of spreading sequences, and each group of spreading sequences includes a plurality of spreading sequences;
the selecting unit selects groups of spreading sequences in the set of spreading sequences; and
the spreading unit spreads the plurality of symbols of the data by using spreading sequences in the groups of spreading sequences selected by the selecting unit.

4. The user equipment of claim 3, wherein the selecting unit:
selects a first group of spreading sequences for a first group of symbols in the set of spreading sequences; and
determines a second group of spreading sequences for a second group of symbols in the set of spreading sequences based on the first group of spreading sequences for the first group of symbols and a hop number for the user equipment selected in a set of hop numbers, wherein the hop number represents an offset between groups of spreading sequences in the set of spreading sequences.

5. The user equipment of claim 1, wherein the user equipment further comprising:
a receiving unit configured to receive the set of spreading sequences transmitted by a base station through higher layer signaling.

6. The user equipment of claim 1, wherein the user equipment further comprising:
a receiving unit configured to receive the set of hop numbers transmitted by a base station through higher layer signaling.

7. A base station, comprising:
a receiving unit configured to receive spread data transmitted by a user equipment, wherein at least two spread symbols of the data are obtained by spreading with different spreading sequences, and the spreading sequences are selected from a set of spreading sequences; and
a de-spreading unit configured to de-spread the data according to the spreading sequences in the set of spreading sequences,
wherein the base station further comprises a transmitting unit configured to transmit the set of spreading sequences to the user equipment through higher layer signaling.

8. The base station of claim 7, wherein
the de-spreading unit de-spreads, for each spread symbol of the data, by using the spreading sequences in the set of spreading sequences sequentially until the de-spreading is successful.

9. The base station of claim 7, wherein
the de-spreading unit sequentially de-spreads spread symbols of the data according to the spreading sequences in the set of spreading sequences and hop numbers in a set of hop numbers until the de-spreading is successful, wherein the hop numbers represent offsets between spreading sequences in the set of spreading sequences.

10. The base station of claim 9, wherein the base station further comprising:
a transmitting unit configured to transmit the set of hop numbers to the user equipment through higher layer signaling.

11. The base station of claim 7, wherein
the set of spreading sequences includes a plurality of groups of spreading sequences, and each group of spreading sequences includes a plurality of spreading sequences;
the de-spreading unit de-spreads, for each group of spread symbols of the data, by using the spreading sequences in the set of spreading sequences sequentially until the de-spreading is successful.

12. The base station of claim 11, wherein
the spreading unit sequentially de-spreads groups of spread symbols of the data according to groups of spreading sequences in the set of spreading sequences and hop numbers in a set of hop numbers until the de-spreading is successful, wherein the hop numbers represent offsets between groups of spreading sequences in the set of spreading sequences.

* * * * *